United States Patent [19]

Holme

[11] Patent Number: 4,776,207
[45] Date of Patent: Oct. 11, 1988

[54] LEAK DETECTORS

[75] Inventor: Alan E. Holme, East Sussex, England

[73] Assignee: The BOC Group plc, Windlesham Surrey, England

[21] Appl. No.: 47,234

[22] Filed: May 7, 1987

[30] Foreign Application Priority Data

May 9, 1986 [GB] United Kingdom ............... 8611364

[51] Int. Cl.⁴ ............................................. G01M 3/20
[52] U.S. Cl. ........................................................ 73/40.7
[58] Field of Search ........................................ 73/40.7

[56] References Cited

U.S. PATENT DOCUMENTS

| | | | |
|---|---|---|---|
| 3,342,990 | 9/1967 | Barrington et al. | 73/40.7 X |
| 3,626,760 | 12/1971 | Briggs et al. | 73/40.7 |
| 3,690,151 | 9/1972 | Briggs | 73/40.7 |
| 3,762,212 | 10/1973 | Morley et al. | 73/40.7 |
| 4,472,962 | 9/1984 | Mennenga | 73/40.7 |
| 4,608,866 | 9/1986 | Bergquist | 73/40.7 |

FOREIGN PATENT DOCUMENTS

| | | | |
|---|---|---|---|
| 169647 | 10/1982 | Japan | 73/40.7 |
| 48630 | 3/1984 | Japan | 73/40.7 |

Primary Examiner—Stewart J. Levy
Assistant Examiner—Joseph W. Roskos
Attorney, Agent, or Firm—David A. Draegert; Larry R. Cassett

[57] ABSTRACT

Apparatus for leak testing an article by detecting with a vacuum detector the leakage of search gas through the article, the apparatus including a pumping system predominantly for evacuating the article under test together with an auxiliary pumping system for evacuating a search gas detector responsible to the search gas leaking through the article.

11 Claims, 1 Drawing Sheet

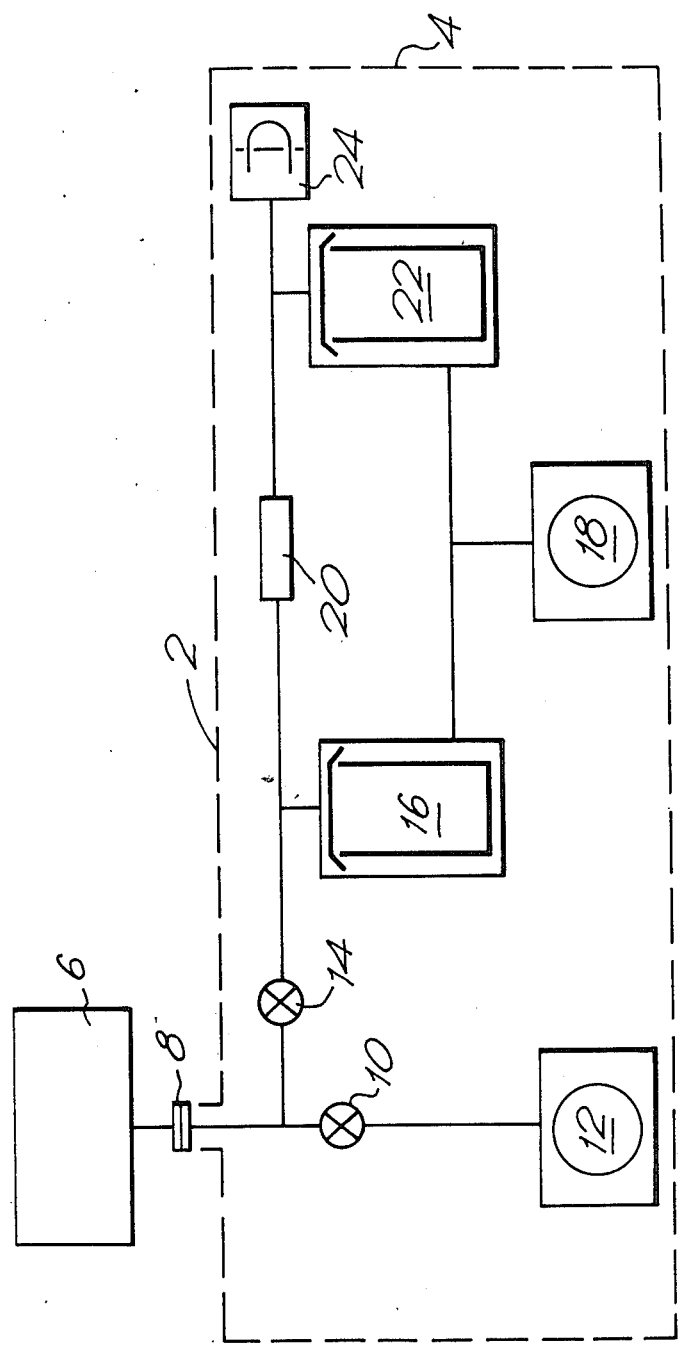

LEAK DETECTORS

This invention relates to gas leak detectors and is particularly, though not exclusively, concerned with detectors embodying a mass spectrometer responsive to the presence of a test gas. The invention is predominantly directed to leak detectors which are portable or which are otherwise constructed as an integral unit, for example, for fitting onto or into a system embodying a chamber or enclosure to be tested or leakage.

It is known to test an article for leakage by applying a search gas such as helium to one surface of the article and using a vacuum detector such as a mass spectrometer to detect the presence of any search gas which may have penetrated to an opposite surface.

Typically, the search gas is applied to shroud the outside of the article under test such as a chamber, the interior of which is exhausted and which communicates with the mass spectrometer. Alternativley, the search gas may be applied under pressure to the interior of the container under test, with an evacuated probe communicating with a mass spectrometer being applied to the container outer surface. In each case, the mass spectrometer indicates leakage by being responsive to the helium or other search gas employed.

For satisfactory performance, the mass spectrometer should operate at a low pressure typically of the order of $10^{-4}$ mbar which may be difficult to achieve and maintain in the presence of condensable vapours such as water vapour or other contaminants such as volatile hydrocarbons which may be evolved from within the article under test..

A number of methods have been proposed to prevent condensable vapours reaching a mass spectrometer used as a leak detector. In one such method, a cooled surface is positioned between the chamber under test and the mass spectrometer to condense out such vapours. The cooled surface, which may be in the form of a cold trap or chamber, is positioned at the mass spectrometer inlet and may be cooled by a cryogenic liquid such as liquid nitrogen. This method, however, suffers from the disadvantages of requiring a constant supply of the cryogenic liquid which may be difficult and inconvenient to handle and which may present storage problems; this method also suffers from the disadvantage of not permanently removing from the low pressure system or rendering inert any vapour so condensed.

In an alternative method where the chamber under test is evacuated by a main vapour diffusion pump backed by a mechanical pump, the diffusion pump is designed to have a poor compression ratio for helium but to pump air and water vapour efficiently. The chamber under test is connected between the main pump and the backing pump. The main pump, which may alternatively be a turbomolecular pump, evacuates both air and condensable vapours from the mass spectrometer but allows helium to pass backwards from the chamber to the spectrometer. This method of operation permits leak testing at pressures up to 0.7 mbar in the test chamber. However, test sensitivity is reduced compared with the conventional method herein above described, and the response time of the detector also is increased since it depends on the backing pump; furthermore, performance is very sensitive to power input to the diffusion pump heater.

It is an object of the present invention to produce a gas leak detector better able to maintain an optimum operating pressure.

The present invention, according to its broadest aspect, provides apparatus for leak testing an article by detecting with a vacuum detector the leakage of search gas through the article, the apparatus including a pumping system predominantly for evacuating the article under test together with an auxiliary pumping system for evacuating a search gas detector responsible to search gas leaking through the article.

The pumping system predominantly for evacuating the article under test conveniently embodies a diffusion pump of known kind and may comprise the known combination of a diffusion pump with a backing pump.

Ideally the auxilliary pump also comprises a diffusion pump of known kind which may be pumped by the backing pump of the article pumping system or by an independent backing pump. In an alternative embodiment of the invention the diffusion pump may be replaced by a turbomolecular pump.

Suitablly, the search gas detector is a mass spectrometer of the kind well known in the art.

An embodiment of the invention will now be particularly described by way of example with reference to the accompanying drawing which is a schematic diagram of a portable mass spectrometer leak detector unit embodying the two pumps of the invention.

Referring to the drawing, the leak detector indicated generally at 2 is a portable leak detector constructed as an integral unit within a housing 4.

The leak detector unit 2 may alternatively be adapted for fitting onto or into a system embodying an enclosure or chamber 6 to be tested for gas leakage.

The leak detector 2 includes externally of the housing 4 a multi-purpose inlet 8 adapted for connection to the chamber 6 in the manner well known in the art. Inlet 8 is connected through a roughing valve 10 to a roughing pump 12 effective to produce initial coarse evacuation of the chamber 6 before connection to the leak detector per se by way of test valve 14. During coarse evacuation roughing valve 10 is open with test valve 14 being closed.

Connected to the test valve is the leak detector per se. The leak detector comprises a diffusion pump or turomolecular pump 16 which is connected to the chamber 6 by way of test valve 14 and which is evacuated by a backing pump 18. By being connected directly to the chamber 6 through test valve 14, diffusion pump 16 is effective predominately to pump the chamber 6.

Also connected to test valve 14 through a restrictive orifice 20 is auxiliary diffusion pump 22 which also is, in this embodiment of the invention, evacuated by the backing pump 18 but which may alternatively be evacuated by an independent backing pump or by the roughing pump 12.

Diffusion pump 22 is connected directly to a mass spectrometer leak detector 24 responsive to search gas sprayed onto or around the chamber 6.

The restrictive orifice 20 is sized to ensure that the diffusion pump 22 is effective to predominantly pump the mass spectrometer 24 to ensure that any increase in gas pressure within the chamber 6, produced for example, by exercise leakage of gas into the chamber or by evolution or desorbtion of gas from the walls of the chamber, do not produce a corresponding increase of gas pressure in the mass spectrometer 24. The present invention accordingly ensures that the pressure of gas in the mass spectrometer can be kept at the optimum level, preferably below $10^{-4}$ mbar, relatively independently of fluctuations in pressure of gas within the chamber 6.

By the use of the invention, the size of the pumping system which would be necessary to maintain optimum pressure of gas within the mass spectrometer 24 irrespective of a relatively high gas pressure in the chamber 6 can be significantly reduced. Typically a diffusion pump having a pumping speed of 100 liters per second in a conventional mass spectrometer leak detector employing one such pump only, can be replaced by two diffusion pumps each having pumping speeds of only 10 liters per second.

It will be appreciated that the leak detector of the present invention enables a cheaper and more efficient pumping system to be employed while maintaining a more constant and lower pressure of gas within the mass spectrometer itself.

The use of two diffusion or like pumps in an independent leak detector unit enables the unit to be made more compact and therefore more readily portable or capable of fitting into existing systems.

What we claim is:

1. Apparatus for leak testing an article by detecting with a vacuum detector the leakage of search gas through the article, the apparatus including an inlet to the article under test, a search gas detector responsive to the seach gas leaking through the article, a pumping system including a diffusion pump or turbomolecular pump predominantly for evacuating the article under test and an auxiliary pumping system including a diffusion pump or turbomolecular pump for evacuating the search gas dectector wherein the pumping system and the auxiliary pumping system are connected substantially at the inlets of the article under test and the seach gas detector, respectively, and the connection is by way of a restrictive orfice located between the article under test and the search gas detector and sized to ensure that the search gas detector is pumped predominantly by the auxiliary pumping system.

2. Apparatus as claimed in claimed 1 in which an independent roughing pump is provided for initially evacuating the search gas detector.

3. Apparatus as claimed in claim 1 in which the pumping system together with the auxiliary pumping system are contained within the apparatus housing.

4. Apparatus as claimed in claim 3 in which the restrictive office is sized to ensure that a rise in gas pressure within the chamber under test, does not produce a corresponding rise in gas pressure within the search gas detector.

5. Apparatus for leak testing an article by detecting with a vacuum detector the leakage of search gas through the article, the apparatus including an inlet to the article under test, a search gas detector responsive to the search gas leaking through the article, a pumping system predominantly for evacuating the article under test, and an auxiliary pumping system for evacuating the search gas detector, wherein the pumping system and the auxiliary pumping system are connected substantially at the inlets of the article under test and the search gas detector, respectively, and the connection is by way of a restrictive orfice sized to ensure that a rise in gas pressure within the chamber under test, does not produce a corresponding rise in gas pressure within the search gas detector.

6. Apparatus as claimed in claim 5 in which the pumping system together with the auxiliary pumping system are contained within the apparatus housing.

7. Apparatus as claimed in claim 6 in which the pumping system includes a diffusion pump or turbomolecular pump.

8. Apparatus as claimed in claim 7 in which the auxiliary pumping system includes a diffusion pump or turbomolecular pump.

9. Apparatus as claimed in claim 8 in which the diffusion pump or turbomolecular pump are backed by roughing pump.

10. Apparatus as claimed in claim 9 in which an independent roughing pump is provided for initially evacuating the search gas detector.

11. Apparatus as claimed in claim 10 in which the search gas detector is a mass spectrometer head.

* * * * *